United States Patent Office 3,464,984
Patented Sept. 2, 1969

3,464,984
THIOMORPHOLINE DERIVATIVES CONTAINING A 5-NITROTHIAZOLYL-(2) RADICAL IN 4-POSITION
Atso Ilvespaa, Neu-Allschwil, Switzerland, assignor to Ciba Corporation, New York, N.Y., a corporation of Delaware
No Drawing. Filed June 28, 1966, Ser. No. 561,050
Claims priority, application Switzerland, July 23, 1965, 10,360/65; May 31, 1966, 7,841/66
Int. Cl. C07d 93/10; A61k 27/00
U.S. Cl. 260—243                                    4 Claims

ABSTRACT OF THE DISCLOSURE

New thiomorpholines that carry a 5-nitrothiazolyl-(2) radical on the nitrogen atom are disclosed. The thiomorpholine and thiazole rings of the new compounds may be further substituted, for example, the thiomorpholine ring by alkyl radicals and/or the 4-position of the thiazole ring, for example, by lower hydrocarbon radicals of aliphatic character or by aryl radicals which latter may themselves be substituted, for example, by halogen atoms, such as chlorine or bromine, by the pseudohalogen trifluoromethyl, by lower alkyls, such as methyl or ethyl, by lower alkoxy groups, such as methoxy, ethoxy or methylenedioxy groups and/or by nitro groups. The compounds are particularly effective against amoebae.

---

The present invention relates to new thiomorpholines that carry a 5-nitrothiazolyl-(2) radical on the nitrogen atom.

The thiomorpholine and thiazole rings of the new compounds may be further substituted, for example the thiomorpholine ring by alkyl radicals and/or the 4-position of the thiazole ring, for example, by lower hydrocarbon radicals of aliphatic character or by aryl radicals which latter may themselves be substituted, for example by halogen atoms such as chlorine or bromine, by the pseudohalogen trifluoromethyl, by lower alkyls such as methyl or ethyl, by lower alkoxy groups such as methoxy, ethoxy or methylenedioxy groups and/or by nitro groups.

Suitable lower hydrocarbon radicals of aliphatic character are above all lower alkyls such as methyl, ethyl, propyl, isopropyl, butyl, isobutyl or pentyl radicals. The aryl radicals are above all phenyl radicals. Alkyl radicals on the thiomorpholine ring are above all lower alkyls, such as those mentioned above.

The new compound possesses valuable pharmacological properties. They are particularly active against amoebae as has been demonstrated in animal tests, for example on hamsters. Thus, for example, 4-[5-nitrothiazolyl-(2)]-2,6 - dimethyl - thiomorpholine produces in hamsters a curative effect against amoebiasis of the liver on subcutaneous or peroral administration of a dose of 100 mg. per kg. of body-weight. The new compounds further possess an inhibitive in-vitreou effect against *Trichomonas foetus*. The new compounds may be used as medicaments in human and veterinary medicine. They are particularly suitable for treating diseases caused by the aforementioned pathogens. The new compounds are also valuable intermediates for the manufacture of other useful substances.

Particularly valuable biological properties are found in compounds of the formula

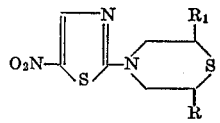

where R and $R_1$ each represents a lower alkyl radical or above all a hydrogen atom—and above all in 4-[5-nitrothiazolyl - (2)] - 2,6-dimethyl-thiomorpholine of the formula

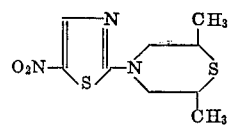

The new compounds are prepared by known methods. For example, a 2-halogeno-5-nitrothiazole is condensed with a thiomorpholine.

A halogen atom in position 2 of the 5-nitrothiazole is above all a chlorine or bromine atom. The condensation is preferably carried out at room temperature, advantageously in the presence of a solvent, such as above all tetrahydrofuran, or an acid amide such as dimethylformamide or in chloroform or dimethylsulfoxide, and/or with a condensing agent, especially a basic condensing agent such as an acetate or carbonate of an alkali metal or an excess of the thiomorpholine used.

The starting materials used are known or, insofar as they are new, they can be prepared in known manner.

The invention includes also any variant of the present process in which an intermediate obtained at any stage thereof is used as starting material and any remaining step/steps is/are carried out or the process is discontinued at any stage thereof, or in which the starting materials are formed under the reaction conditions or are used in the form of their salts, and it includes also the new starting materials.

The new compounds can be used as medicaments, for example in the form of pharmaceutical preparations containing them in conjunction or admixture with an organic or inorganic, solid or liquid pharmaceutical excipient suitable for interal, for example oral, or parenteral administration. Suitable excipients are substances that do not react with the new compounds, for example water, gelatin, lactose, starches, magnesium stearate, talcum, vegetable oils, benzyl alcohols, gums, polyalkyleneglycols, cholesterol or other known medicinal excipients. The pharmaceutical preparations may be, for example, tablets, dragees or capsules, or in liquid form solutions, suspensions or emulsions. They may be sterilized and/or contain auxiliaries, such as preserving, stabilizing, wetting or emulsifying agents, salts for regulating the osmotic pressure, or buffers. They may also contain other therapeutically valuable substances. The preparations are formulated according to the usual methods.

The above-mentioned compounds may also be used in conjunction or admixture with conventional animal fodders or vehicles in veterinary medicine in the form of preparations or as animal fodders or additives to animal fodders in animal husbandry.

The following examples illustrate the invention.

Example 1

A solution of 10.5 g. of 2-bromo-5-nitrothiazole in 40 cc. of dimethylsulfoxide is stirred dropwise within 20 minutes at 15 to 25° C. into a solution of 13.1 g. of 2,6-dimethyl-thiomorpholine in 50 cc. of dimethylsulfoxide. The batch is stirred on overnight at room temperature and then evaporated to dryness at 50 to 65° C. under a vacuum of 0.1 mm. Hg in a rotary evaporator. The residue is agitated with 200 cc. of methylenechloride and 400 ml. of water; the methylenechloride extract is then shaken with 3×100 cc. of water, dried and evaporated. The residue, a thickly liquid oil, is taken up in benzene, chromatographed on 30 times its own weight of alumina and eluted with benzene, to yield 4-[5-nitrothiazolyl-(2)]-2,6-dimethyl-thiomorpholine of the formula

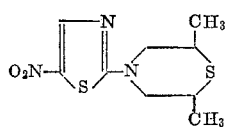

melting at 81 to 82° C.

Example 2

A solution of 18.8 g. of 2-bromo-5-nitrothiazole in 70 cc. of dimethylsulfoxide is stirred dropwise within 15 minutes at 15–20° C. into a solution of 18.5 g. of thiomorpholine in 120 cc. of dimethylsulfoxide. The batch is stirred on overnight at room temperature and then evaporated to dryness at 50–65° C. under a pressure of 0.1 mm. Hg on a rotary evaporator. The residue is agitated with 300 cc. of methylene chloride and 300 cc. of water; the methylene chloride solution is then shaken with 4×100 cc. of water, dried and evaporated. The residue gradually crystallizes. For purification it is dissolved in methylene chloride and chromatographed on 50 times its weight of alumina (activity II), and eluted with methylene chloride. From the first fractions, 4-[5-nitrothiazolyl-(2)]-thiomorpholine of the formula

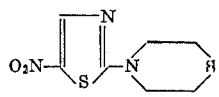

is obtained with, after being recrystallized from methanol. melts at 148° C.

Example 3

Tablets containing 500 ml. of 4-[5-nitrothiazolyl-(2)]-2,6-dimethyl-thiomorpholine may be prepared with the following ingredients:

| | Mg. per tablet |
|---|---|
| 4 - [5-nitrothiazolyl-(2)]-2,6-dimethylthiomorpholine | 500.0 |
| Wheat starch | 40.0 |
| Colloidal silicic acid with hydrolyzed starch | 30.0 |
| Arrowroot | 30.0 |
| Magnesium stearate | 6.0 |
| Talc | 19.0 |
| | 625.0 |

Method

Half of the wheat starch is pasted with four times the quantity of water on a water-bath. 4-[5-nitrothiazolyl-(2)]-2,6-dimethyl-thiomorpholine is homogeneously mixed with the remaining starch, then kneaded with the paste and with a sufficient quantity of water to form a plastic mass. The colloidal silicic acid with hydrolyzed starch is then worked in in portions.

The plastic mass is passed through a sieve having a 4–5 mm. mesh and dried at 45° C. The dried granulate is passed through a sieve of 0.8–1.4 mm. mesh and the remaining disintegrating and lubrication agents are then added. After further homogenization tablets having a diameter of 11.5 mm. and weighing 625 mg. are compressed in the conventional manner.

What is claimed is:

1. A compound of the formula

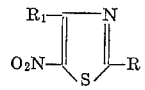

in which R stands for a member selected from the group consisting of unsubstituted and lower alkyl substituted thiomorpholino and $R_1$ stands for a member selected from the group consisting of hydrogen, a lower hydrocarbon radical of aliphatic character, unsubstituted phenyl and phenyl substituted by at least one member selected from the group consisting of halogen, trifluoromethyl, lower alkyl, lower alkoxy, methylenedioxy and nitro.

2. A compound as claimed in claim 1, in which $R_1$ stands for hydrogen and R for a radical of the formula

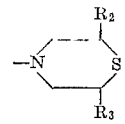

in which $R_2$ and $R_3$ each represents a member selected from the group consisting of hydrogen and lower alkyl.

3. A compound as claimed in claim 1, said compound being 4-[5-nitro-thiazolyl-(2)]-2,6-dimethyl-thiomorpholine of the formula

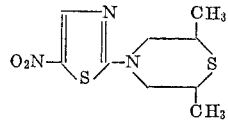

4. A compound as claimed in claim 1, said compound being 4-[5-nitrothiazolyl-(2)]-thiomorpholine of the formula

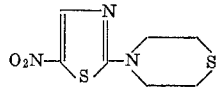

References Cited

UNITED STATES PATENTS 3,318,904   5/1967   Schmidt et al. _____ 260—243

ALEX MAZEL, Primary Examiner

R. J. GALLAGHER, Assistant Examiner

U.S. Cl. X.R.:
424—246